(12) United States Patent
Howard

(10) Patent No.: US 7,752,719 B2
(45) Date of Patent: Jul. 13, 2010

(54) ROPE TENSIONING DEVICE

(76) Inventor: Michael Christopher Howard, 97 Deakin Street, Bentleigh East (AU) 3165

(*) Notice: Subject to any disclaimer, the term of this patent is extended or adjusted under 35 U.S.C. 154(b) by 784 days.

(21) Appl. No.: 11/571,000

(22) PCT Filed: Jul. 19, 2004

(86) PCT No.: PCT/AU2004/000961

§ 371 (c)(1),
(2), (4) Date: Dec. 20, 2006

(87) PCT Pub. No.: WO2005/012036

PCT Pub. Date: Feb. 10, 2005

(65) Prior Publication Data

US 2009/0260195 A1    Oct. 22, 2009

(30) Foreign Application Priority Data

Jul. 30, 2003   (AU) .............................. 2003903983

(51) Int. Cl.
*F16G 11/10*   (2006.01)
*F16G 11/00*   (2006.01)

(52) U.S. Cl. .............................. 24/134 L; 24/132 AA; 24/343; 24/346

(58) Field of Classification Search ................ 24/132 R, 24/133, 134 L, 132 AA, 343, 345, 346
See application file for complete search history.

(56) References Cited

U.S. PATENT DOCUMENTS

| 465,577 | A | * | 12/1891 | Kiefer | 24/130 |
| 2,136,014 | A | * | 11/1938 | McDonald | 24/130 |
| 4,120,077 | A | * | 10/1978 | Fink | 24/130 |
| 4,719,668 | A |   | 1/1988 | Cavanagh |  |
| 5,205,687 | A | * | 4/1993 | Boyland | 24/130 |
| 5,987,710 | A | * | 11/1999 | Paul et al. | 24/130 |
| 2004/0093699 | A1 | * | 5/2004 | Johnson | 24/130 |
| 2005/0161653 | A1 | * | 7/2005 | Greer et al. | 254/262 |

FOREIGN PATENT DOCUMENTS

| DE | 2517740 | 11/1976 |
| FR | 2182703 | 12/1973 |
| GB | 2081801 | 2/1982 |
| WO | 0065184 | 11/2000 |

* cited by examiner

*Primary Examiner*—Robert J Sandy
(74) *Attorney, Agent, or Firm*—Volpe and Koenig, PC

(57) ABSTRACT

A rope tensioning device includes an elongated base having a first hooked end and a second hooked end, an anchor for anchoring the rope on the device, and a clamp. The clamp is adapted to grip the rope inserted into the device allowing it to be pulled in a tightening direction to tension the rope. The clamp is adapted to prevent the rope pulling in a reverse direction.

17 Claims, 10 Drawing Sheets

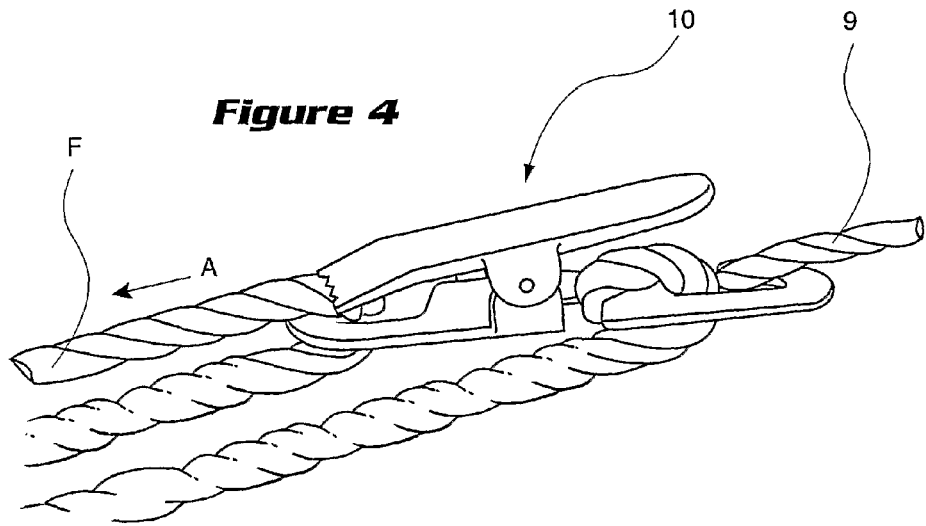
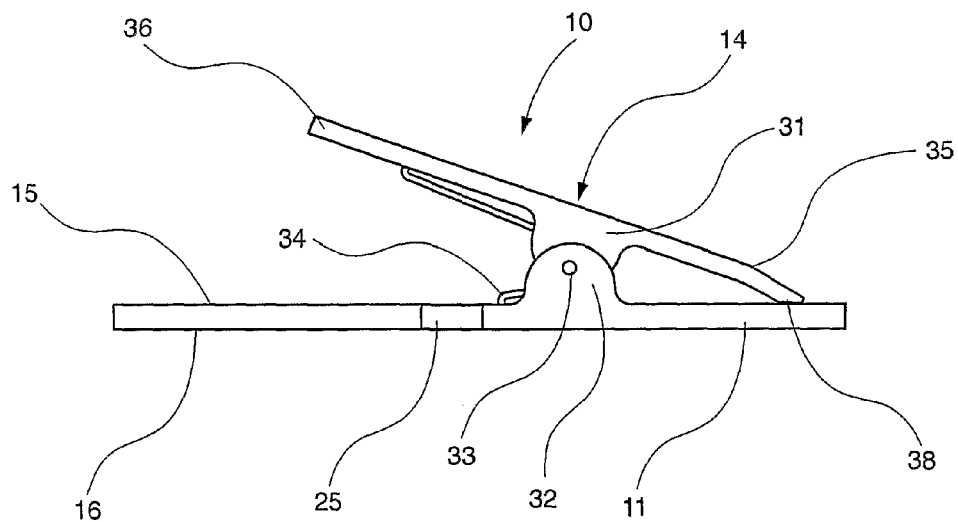

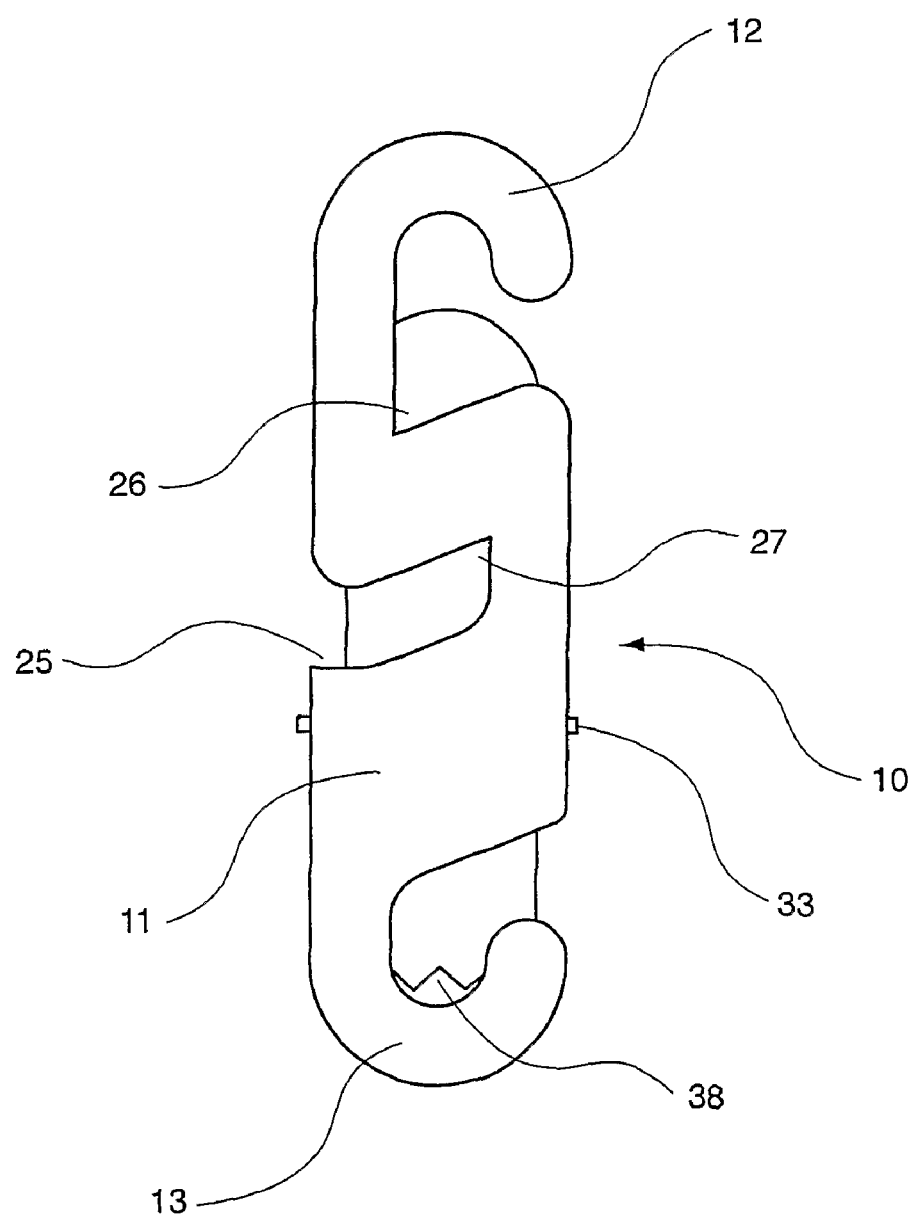

Figure 7
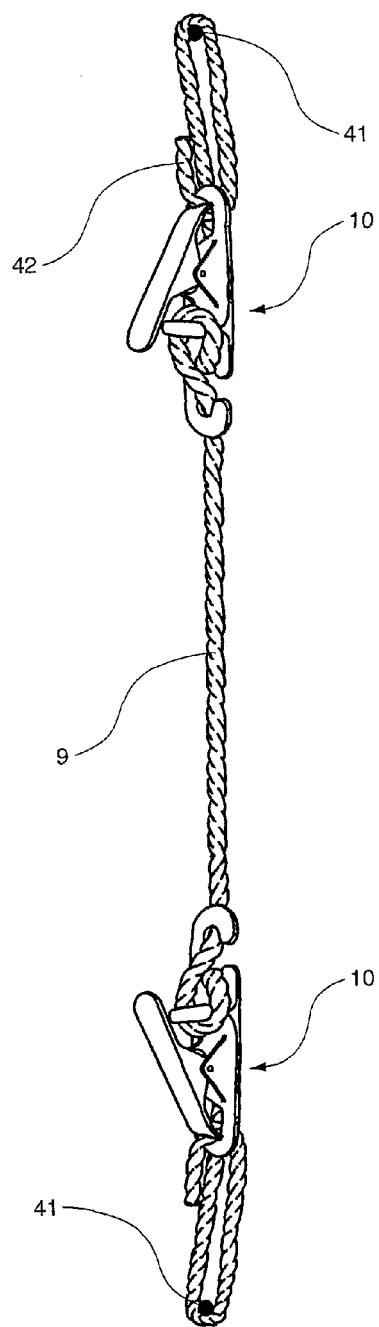
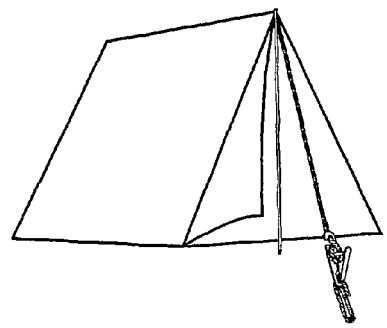
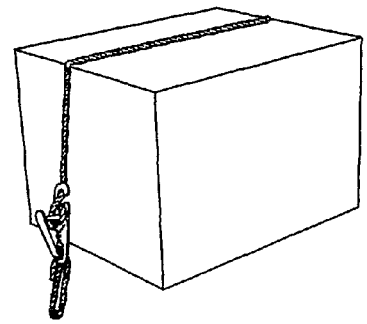
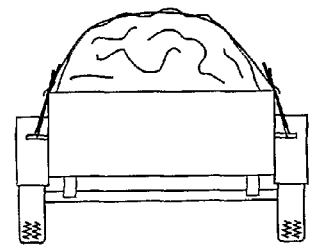
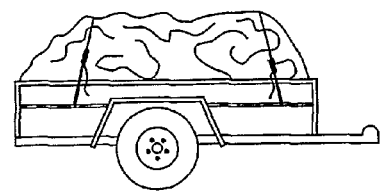
Figure 8

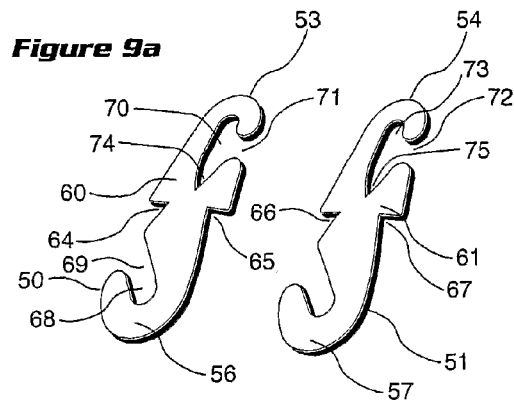
*Figure 9a*
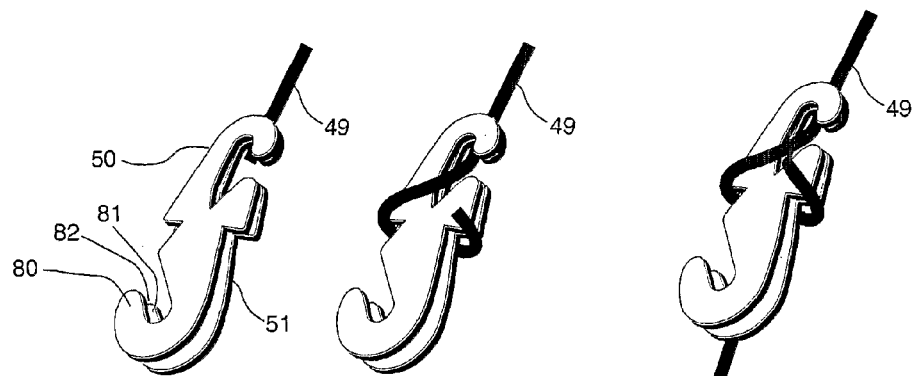
*Figure 9b*  *Figure 9c*  *Figure 9d*
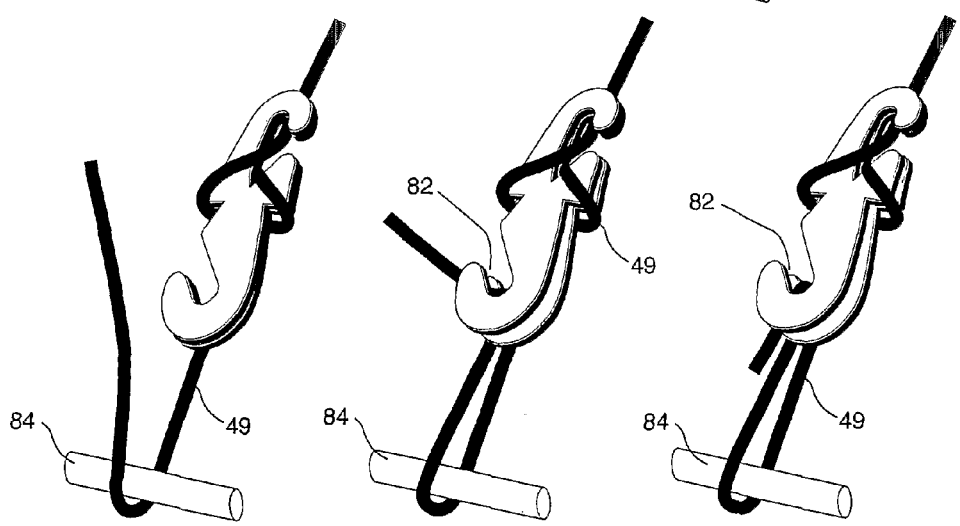
*Figure 9e*  *Figure 9f*  *Figure 9g*

ROPE TENSIONING DEVICE

FIELD OF THE INVENTION

The invention is a tensioning device for tightening or fastening rope. One non-limiting example of an application for the device is that of fastening rope around a load and tightening the tension on the load.

It is understood that the term 'rope' includes any length of cord including twist ropes, straps, multi-strand cords, lashings and the like.

BACKGROUND OF THE INVENTION

More often than not, knots and rope tightening devices are used to secure small objects being transported on utility vehicles and vans, or on a large scale to secure cargo and freight transported by trucks, aircrafts, ships, rail vehicles, etc.

Knot tying is the most simple and rudimentary form of securing a length of rope. Even so, knots used by those experienced can be quite complicated to tie and difficult to teach. One example is the "truckie's knot" which is formed by following a rigid sequence loop, twists and turns. While effective in fastening rope around a load there is a danger of failure if not tied properly.

Furthermore, to tie these kinds of knots is time consuming and if the knots are over-tightened even more time is required to release them.

Other techniques of fastening ropes include using elastic cords and buckled straps. Elastic cords usually have a shortened life due to the constant stretching to which they are subjected. Generally, the conditions of use of tying ropes about a load are quite harsh and not suitable for elastic cords.

Buckled straps work well but the buckles are usually attached to the straps and cannot be used on a separate strap or with any kind of rope that is not sufficiently flat to thread through the buckle. Because the buckles are attached to the straps damage to the load or vehicle may occur when throwing the strap over the load and vehicle to secure it to the vehicle's underside. It often happens that the user becomes frustrated with the buckles and cuts these off to continue to use the strap as a length of rope.

Winching straps are also a strap-based product having a permanent metal buckle with metal hooks at both ends that act as fasteners. A load is secured by winching the strap around a central hub. Aside from having the above described drawbacks of the buckled strap, the winching strap is a complex system that may involve springs, gears and other moving parts making it costly to manufacture, more likely to fail and difficult to use.

The present invention seeks to provide a simple rope tensioning device that is simple and quick to use.

SUMMARY OF THE INVENTION

In accordance with the present invention there is provided a rope tensioning device comprising,
an elongate base having a first hooked end and a second hooked end,
anchoring means for anchoring the rope on the device, and clamp means,
wherein the clamp means are adapted to grip rope inserted into the device allowing it to be pulled in a tightening direction to tension the rope, the clamp means being adapted to prevent the rope pulling in a reverse direction.

The clamp means may comprise a lever arm mounted to a front face of the base. It may have one end biased towards the front face to grip the rope against the front face.

The lever arm is preferably pivoted approximately at mid length and biased so that one end is lowered against the front face at the second end and the other end is raised.

The lever arm is preferably provided at its lowered end with teeth to grip the rope. Preferably, the teeth are angled to prevent the rope pulling in the reverse direction but to allow rope to slide past in the tightening direction.

The anchoring means may be a notch provided in a side of the elongate base.

In an alternative construction, the anchoring means may comprise a peg projecting from the front face of the elongate base. The peg is preferably located between the lever arm and the hook at the first end of the base. The peg has a head and a throat around which rope is wrapped whereby the head prevents the rope from disengaging the peg. The head may be angled away from the first hook at the first end to improve anchoring.

The lever is preferably pivoted on a pin supported between two flanges on the front face. The lever may be biased by a cylindrical helical spring wound around the pin.

The hooks at each end of the elongate base may face opposite directions. The base of the first hook preferably has a wedge.

According to the present invention there is also provided a method of tensioning rope that is fixed at one end using a rope tightening device comprising,
inserting a length of rope through a first opening defined by a hooked first end of an elongate base so that the rope extends from a front face of the base towards a rear face of the base,
anchoring the rope to the device by wrapping the rope around anchoring means on the device,
returning the rope back through the first opening and on past the rear of the elongate base,
looping the rope around a support separate from the rope tightening device,
returning the rope into a second opening formed by a second hooked end at the rear of the elongate base,
clamping the rope with a one way clamp at the second hooked end; and
tightening the rope by pulling it so that the clamp prevents the rope moving in the reverse direction.

The clamp may be a pivoting lever having one end biased towards the front face. The lever preferably prevents rope moving in the reverse direction by gripping the rope with teeth on the lever end, but allows the rope to move in a tightening direction.

Preferably the rope is anchored to the base by looping it around a peg projecting from the front face of the elongate base.

Alternatively the rope is anchored to the base by looping the rope through a notch in the side of a base.

The method includes pivoting the lever arm at approximately mid-length of the lever arm and biasing it so that one end is lowered against the front face and the other end is raised. Releasing the rope is achieved by pressing on the raised end of the lever arm.

BRIEF DESCRIPTION OF THE DRAWINGS

The present invention is described further by way of example with reference to the accompanying drawings of which:

FIG. 4 illustrates a second embodiment of the rope tightening device inserted with rope;

FIG. 5 is a side view of the rope tightening device of FIG. 4;

FIG. 6 is an under plan view of the rope tightening device of FIG. 4;

FIG. 7 illustrates two rope tightening devices of the first embodiment inserted with rope in a no knot formation;

FIG. 8 illustrates various uses of the rope tightening device;

FIGS. 9a to 9g show in sequence perspective views of how to operate an alternative rope tightening device comprising two components;

DETAILED DESCRIPTION OF PREFERRED EMBODIMENTS OF THE INVENTION

Figure 1:
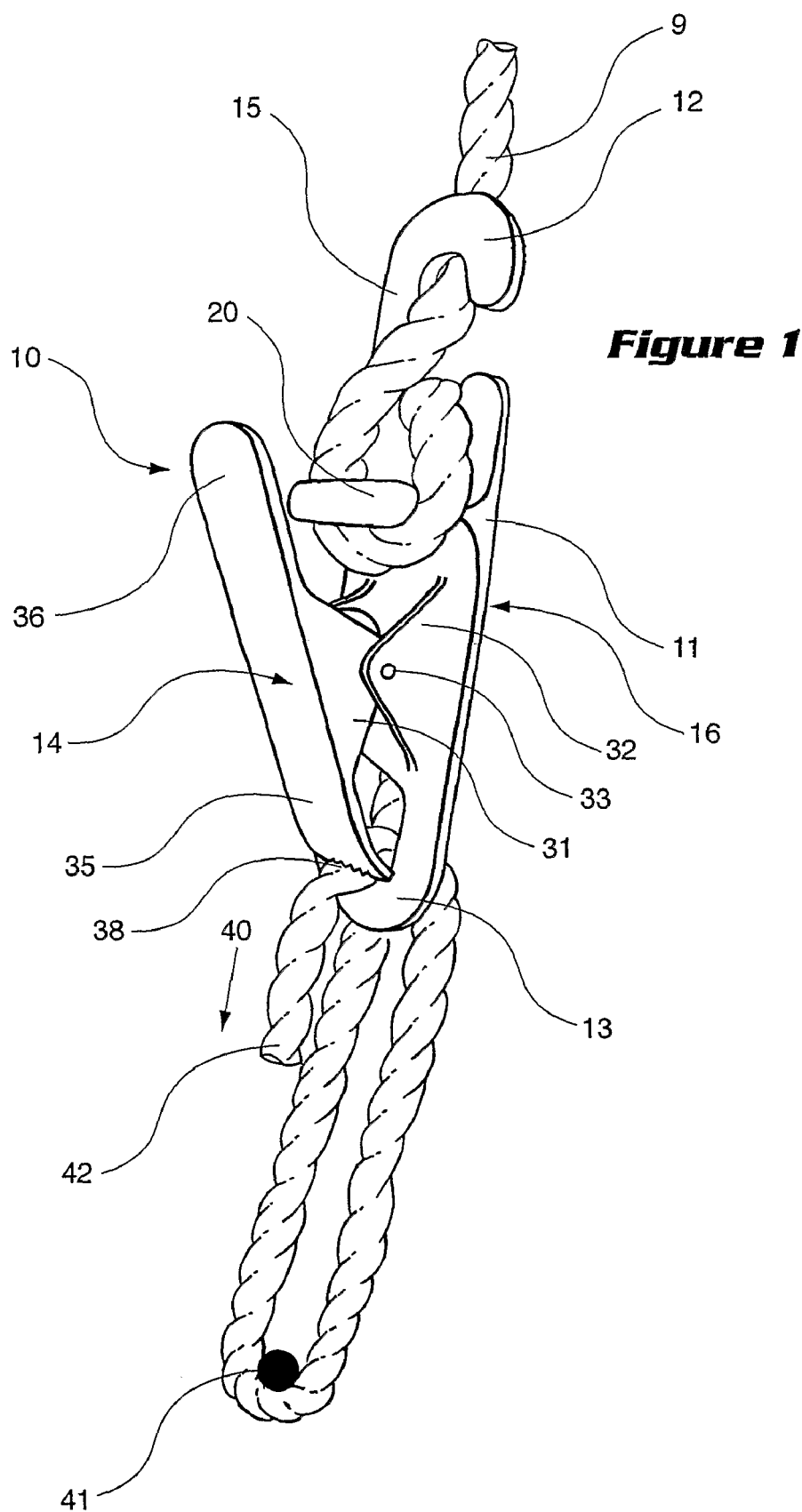
FIG. 1 is a perspective view of a first embodiment of a rope tightening device threaded with rope.
Figure 2:
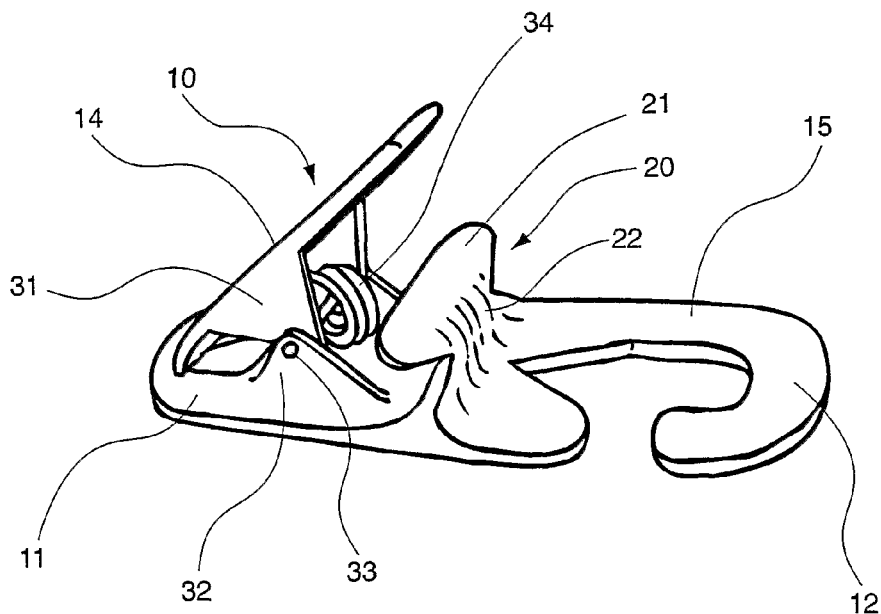
FIG. 2 is a rear-perspective view of the rope tightening device of FIG. 1.
Figure 3:
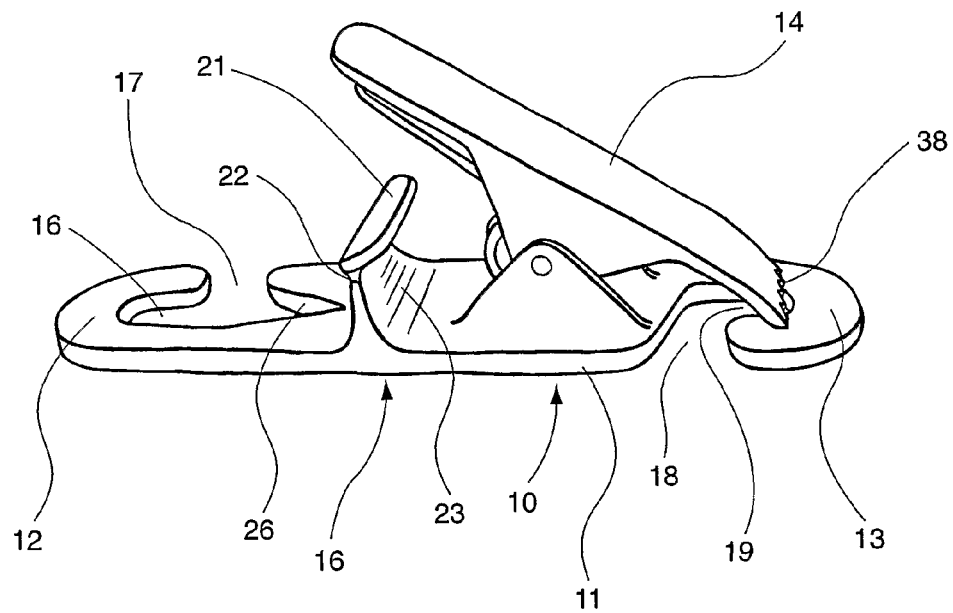
FIG. 3 is a front perspective view of the rope tightening device of FIG. 1.

The various elements identified by numerals in the drawings are listed in the following integer list.

Integer List
- 9 Rope
- 10 Rope tightening device
- 11 Flat elongate base
- 12 First end/hook
- 13 Second end/hook
- 14 Gripping lever arm
- 15 Front face
- 16 Opening
- 17 Entrance
- 18 Opening
- 19 Entrance
- 20 Peg
- 21 Head
- 22 Throat
- 23 Concave face
- 25 Notch
- 26 Wedge
- 27 Wedge
- 31 Downward flange
- 32 Upward flange
- 33 Pin
- 34 Spring
- 35 Clamping end
- 36 Reaction end
- 38 Teeth
- 40 Arrow
- 41 Support
- 42 Free end
- 49 Rope
- 50 Base member
- 51 Base member
- 53 First hook member
- 54 First hook member
- 56 Second hook member
- 57 Second hook member
- 60 Central anchor section
- 61 Central anchor section
- 64 Notch
- 65 Notch
- 66 Notch
- 67 Notch
- 68 Opening
- 69 Entrance
- 70 Opening
- 71 Entrance
- 72 Entrance
- 73 Opening
- 74 Wedge
- 75 Wedge
- 80 Forward edge
- 81 Forward edge
- 82 Wedge shaped opening
- 84 Anchor rod
- 100 Rope tightening device
- 101 Flat base
- 102 First hooked end
- 103 Second hooked end
- 106 Arm
- 107 Notch
- 108 Notch
- 109 Rope
- 112 Claw
- 113 Anchor rod
- 120 Rope tightening device
- 121 First hooked end
- 122 Flat base
- 123 Second hooked end
- 124 Notch
- 125 Notch
- 126 Notch
- 130 Claw
- 131 Pin
- 132 Rope
- 133 Anchor rod
- 134 Ratchet teeth
- 140 Anchor rod
- 141 Rope
- 142 Weight
- 150 Rope
  Anchor rod Two embodiments of a rope tightening device for fastening rope around a load are illustrated in FIGS. 1 to 8.

The device of FIGS. 1 to 8 is an elongate body provided with hooks and notches and a clamp in the form of a grip lever mounted on the body so that the device can hook, anchor and hold down rope inserted through, and generally fasten a length of rope in a desired configuration.

For the purposes of illustration the device will be described according to its use in tensioning a rope around a load. However, it is understood that other uses are possible; these being described further below.

The rope tightening device 10 specifically comprises a substantially flat elongate base 11 having two ends, first end 12 and a second end 13, and a hook provided at each end. Each hook defines openings 16, 18 respectively and entrances 17 and 19 to the openings to allow the rope to be readily threaded into the openings. Anchoring means on the base anchor the rope to the base and increases the device's hold on the rope.

In the illustrated embodiments all the hooked ends are shown as having side entrances to the openings for assisting rope threading. However, it is to be appreciated that the device can also function without such entrances ie. the "hook" completely surrounds the opening to create an eyelet with no side entrance. The rope can be threaded through the eyelet as one threads a needle.

The device 10 includes a clamp in the form of a gripping lever arm 14 mounted on the base 11. The lever arm 14 is biased towards a front face 15 of the base 11 and clamps down on rope passing thereunder to firm the device's grip on the rope 9.

The first embodiment, illustrated in FIGS. 1 to 3 and 6, comprises an anchoring means in the form a peg 20 located between the first hook end 12 and the lever arm 14. The peg 20 projects outwardly from the front face 15 and includes a head 21 and a throat 22. Rope is adapted to be wrapped around the peg 20, and specifically the throat 22, to hold the rope to the device 10 in a secure manner. Head 21, being larger than the throat 22, ensures the rope is captured between the head 21 and front face 15 thereby preventing escape.

To further improve the effectiveness of the peg 20 to restrain a loop of rope, the head 21 of the peg 20 is angled away from the first hooked end 12 and creates a concave face 23 against which the rope loop is held.

The hooks at the hooked ends face opposite directions.

FIGS. 4 to 6 illustrate a second embodiment of the anchoring means in the form of a notch 25. The device's hold on the rope is increased by creating a loop by winding rope around notch 25 and the base of first hooked end 12, which is provided with a V-shaped wedge 26. This prevents the rope sliding out of the hooked end. The notch 25 slants in a parallel direction to the slanting Vshaped wedge 26 to also create a wedge 27 in notch 25 preventing escape of the looped rope from the notch.

Both embodiments are provided with a V-shaped wedge 26 at the first hooked end 12 for capturing the rope inserted into the device.

In the second embodiments the hooks are facing the same direction.

The gripping lever arm 14 is pivotably mounted to the front face 15 at approximately mid length of the arm 14. Two downward flanges 31 on the lever arm 14 align in between two upward flanges 32 on the front face 15. A pin 33 extends through all four flanges to provide a pivoting motion of the lever arm 14 relative to the elongate base 11.

The lever arm 14 is biased by a spring 34 so that one end, the clamping end 35, is lowered against the front face 15 towards the second hooked end 13 while the other end, the reaction end 36, is raised. Clamping end 35 is forced downwardly against the front face 15 such that rope inserted between the clamping end 35 and front face 15 is clamped therebetween. While the clamping force makes it more difficult to slide the rope through the device, some movement is still possible. Sliding the rope in the direction which tightens the rope around the load is important for readjusting tension in the rope after the rope is inserted in the tightening device 10.

Accordingly, teeth 38 are provided on the end of the clamping end 35 of lever arm 14. The teeth are angled substantially in the direction of slope of the lever arm relative to the elongate base 11. The angled teeth 38 allow rope to slide past the teeth in the tightening direction but resist movement of the rope in the reverse direction.

Arrow 40 in FIG. 1 illustrates rope 9 inserted into the device 10. Arrow 40 indicates the direction which the rope is pulled to tighten the tension around the load.

Pin 33 extends through spring 34 which is a cylindrical helical spring having high stiffness. It is understood that the force of the spring, or the type of spring, may be varied to create different clamping strengths against the rope. However, it is favourable in normal conditions to clamp the rope between the lever arm and elongate base with sufficient strength to prevent the rope moving in the reverse direction past the teeth.

The rope tightening device 10 is used towards the end of a length of rope having its other end tied or anchored to a support. As illustrated in FIG. 1, the length of rope is inserted into the first hooked end of the elongate base from the rear of the base to the front face 15. The rope is looped around peg 20 and inserted back through the first hooked end where the rope nestles into the wedge 26 of the base of the hooked end. With the rope now at the rear of the base 11 it extends down a rear face 16 at the rear of base 11, past the second hooked end and is looped around a support 41 which is separate to the rope tightening device.

For example, in using the device 10 to tie down a load on a trailer, support 41 would be some kind of cross bar member on the chassis of the trailer (see FIG. 8). The rope therefore extends between this support and a first fixed support to tie down a load.

After looping the rope around support 41, the free end 42 of the rope is bought back up to the second hooked end and inserted through the second hooked end from the rear of the elongate base 11 through to the front. By depressing the reaction end 36 of the lever arm 14, the clamping end will be raised above the front face to allow rope to be inserted between the clamping end 35 and front face 15. The user then releases the gripping end 35 and the lever arm clamps down on the rope.

To tighten the tension of the rope around the load 10 the free end 42 is progressively pulled in the direction of arrow 40 until a suitable tension is reached. The lever arm and gripping teeth prevent the rope from moving in the reverse direction as the rope is winched through the device.

It can be seen from FIG. 1 that the rope tightening device 10 can operate as a winch to increase tension in the rope. By way of anchoring peg 20 the rope 9 above the device remains stationary relative to the tightening device 10. By pulling the free end of the rope 9 past the gripping teeth 38 the length of rope between the device and support 41 shortens and the length of rope over the load tightens.

FIG. 4 illustrates how the rope is inserted into the rope tightening device 10 of the second embodiment where the anchoring means includes notch 25. The rope in this case is inserted into the first hooked end from the front face 15 to the rear of the elongate base and then up again through notch 25 where it completes a loop as it inserts to the rear again through the first hooked end 12. The rope nestles into the wedges of both notch 25 and the wedge 26 of the first hooked end so that the rope is retained and anchored to the tightening device.

Similar to the first embodiment the rope then passes along the underside or rear of the elongate base towards a support around which it is looped and bought back up to the second hooked end and inserted therethrough from the rear to the front. Lever arm 14 is then adjusted to allow the rope to pass thereunder and released to clamp the rope in place. The tension on the rope is tightened by pulling free end 42 in a tightening direction of arrow 40.

FIG. 7 illustrates two tensioning devices 10 used in winching two supports 41 towards one another, or increasing rope tension in two directions. Clearly, the device 10 may be used in pairs so that the tension around the load can be adjusted from both ends. An advantage of this arrangement is that there is no requirement for knots to be tied at either end, and this arrangement can increase one tightening force by four times.

Using two devices in series allows for a winch arrangement to not only tie but to pull objects up such as dragging bogged cars out of the ground or lifting heavy objects.

The rope tightening device eases the effort involved in tensioning rope around an object or in lifting an object up over a pulley. The force in pulling the free end in the direction of tightening is of the order of half that required when directly pulling on the rope without the device.

The present rope tightening device can be used in a variety of sizes for a variety of uses. For large heavy cargos a solid and large device made of metal would be needed. The device can also be used in tensioning ropes on tents, awnings and boats. A medium sized device would be required in this case. Builders could use a small version of the device with string line. Gardeners too could use a small version of the device in tying ropes to shrubs and trees etc.

It is envisaged that the larger models would be made of a hard metal such as cast or stamped steel, but the smaller versions could be made of hard plastics.

In another version of the rope tightening device an additional lock could be provided, foreseeably in conjunction with the lever arm to prevent the rope from sliding even in the tightening direction. This would lock the device in the position in which it is left.

Instead of incorporating the lever arm and gripping teeth a more sophisticated ratchet style tooth grip can be used to prevent the rope sliding in a reverse direction. This may involve a series of teeth provided on a one-way rotating gripping barrel, or other equivalents. In this case a lever would not be required but an equivalent mechanism would be required to lift the barrel to allow the rope to be inserted then to clamp back down on to the rope.

The present rope tightening device is economical to produce and effective in its use. It is versatile in that it may come in a variety of sizes and can be used in a variety of applications.

Referring to FIGS. 9a to 9g, the rope tightening device shown therein comprises two separate base members 50 and 51 respectively.

The base members are constructed so that they can be laid flat against each other. Thus their inner surfaces may typically be flat or be formed in a configuration which allows them to readily nest together. Each of the base members is provided with hook members at opposite ends of the base member. Thus in the case of the base member 50, there is a first hook member 53 and a second hook member 56 whereas in the case of the second base member 51, there is a first hook member 54 and second hook member 57.

The base member 50 has a central anchor section 60 which corresponds in shape to the central anchor section 61 of the base member 51.

The central anchor section 60 of the base member 50 comprises notches 64 and 65 and the second base member has corresponding notches 66 and 67.

As in the previous embodiments, the hook members define an opening and an entrance to the opening. Thus the first hook member 53 defines an opening 70 and an entrance 71, the second hook member 56 defines an opening 68 and entrance 69, the first hook member 54 defines an opening 73 and an entrance 72.

The openings 70 and 72 include wedges 74 and 75 respectively.

The forward edges 80 and 81 of the second hook member 56 and second hook member 57 are bent with respect to the plane of the base member so that they extend away from each other to form a wedge shaped opening 82.

Thus it can be seen in using the rope tightening device progressively moving from FIG. 9a to 9g, after the two base members have been nested together the rope 49 is directed through the opening 70 and wound around the rope tightening device so that it fits within the combined notches 64 and 66, and 65 and 67. The rope is then brought back through the opening of the first hook member so that it lies in the combined wedges 74 and 75.

From there, it is fed downwardly to the anchor rod 84 and returned to pass into the opening formed between the two combined second hook members 56 and 57.

The rope is then directed through the wedge shaped opening 82 defined between the forward edges of the two second hook members and pulled to tighten it as is shown in FIG. 9g.

The effect of tightening the rope, by virtue of the fact that the rope is wound around the two base members forces the two base members together and hence jams the rope between the two second hook members 56 and 57. The higher the tension in the rope, the greater the force pushing the two base members together and hence the greater the gripping effect of the combined second hook members preventing the rope from pulling in a reverse direction.

Figure 10:
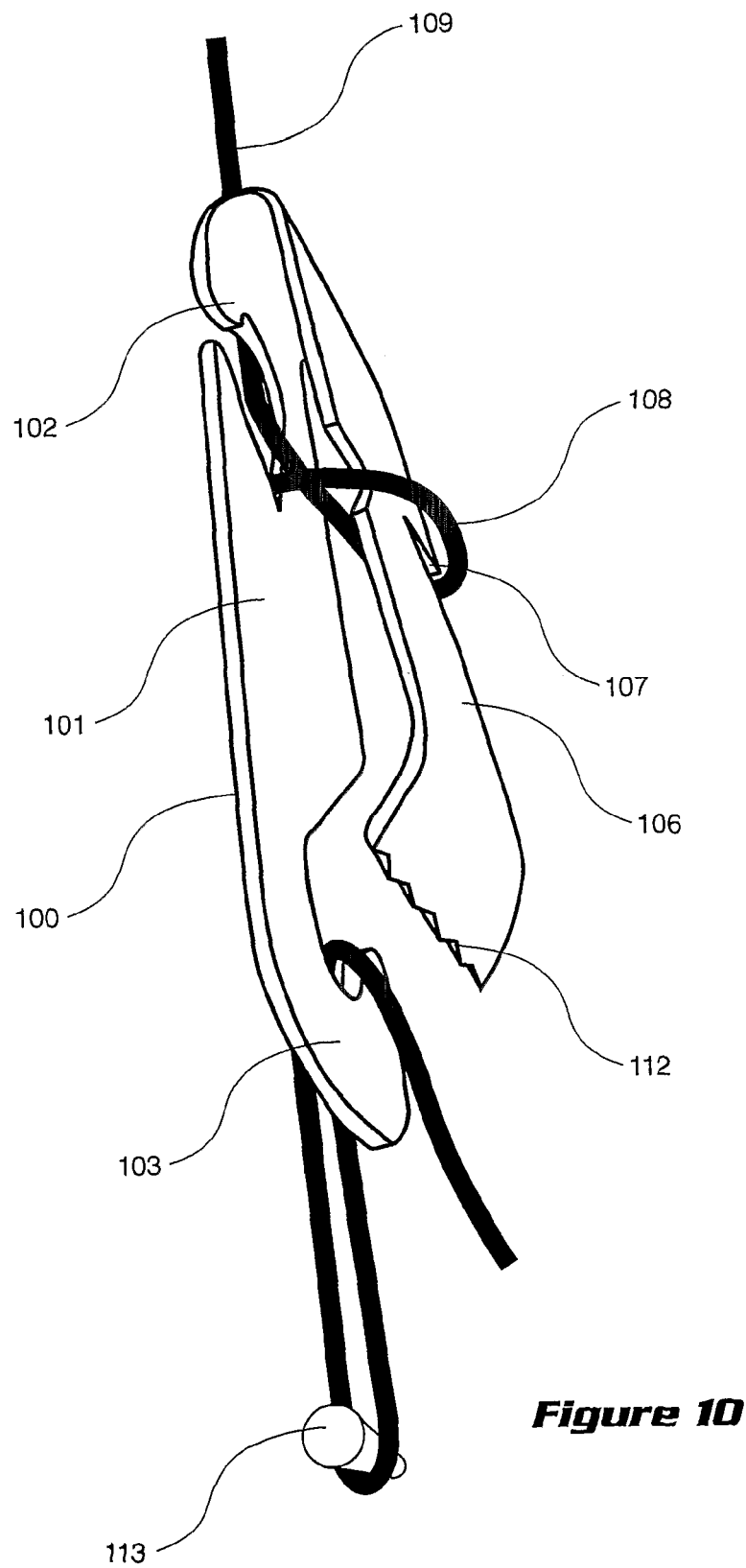
FIG. 10 shows a perspective view of a further rope tightening device.

Referring to FIG. 10, the rope tightening device generally designated 100 in the drawing comprises a flat base 101 having a first hooked end 102 and a second hooked end 103.

The flat base may be formed of any suitable material such as metal or plastic. Suitably, the material forming the flat base comprises a resilient material which is the same material as the arm 106 integrally extending from the first hooked end of the base.

The arm 106 extends lengthways above the flat base so that a claw 112 formed at the end of the arm in the normal rest configuration of the rope tightening device lies generally above the second hooked end 103.

The arm is formed with notches 107 and 108 for purposes to become apparent.

In order to operate the rope tightening device, the rope 109 is threaded through the opening defined by the first hook end 102 and is wrapped around the arm 106 so that it lies within the notches 107 and 108.

The rope is then returned through the opening defined by the first hooked end and is directed over the anchor rod 113. From the rod 113 it returns to pass over the second hooked end 103.

It can be seen that pulling on the downward end of the rope 109 results in tension in the rope pulling the arm 106 down towards the second hooked end so that the claw 112 grips the rope and prevents it pulling in a reverse direction. However, when the rope is pulled upwards from the device, it disengages the gripping effect of the claw and releases tension in the rope, so that the rope tightening device resiliently returns to its original configuration as shown in the drawing.

Figure 11:
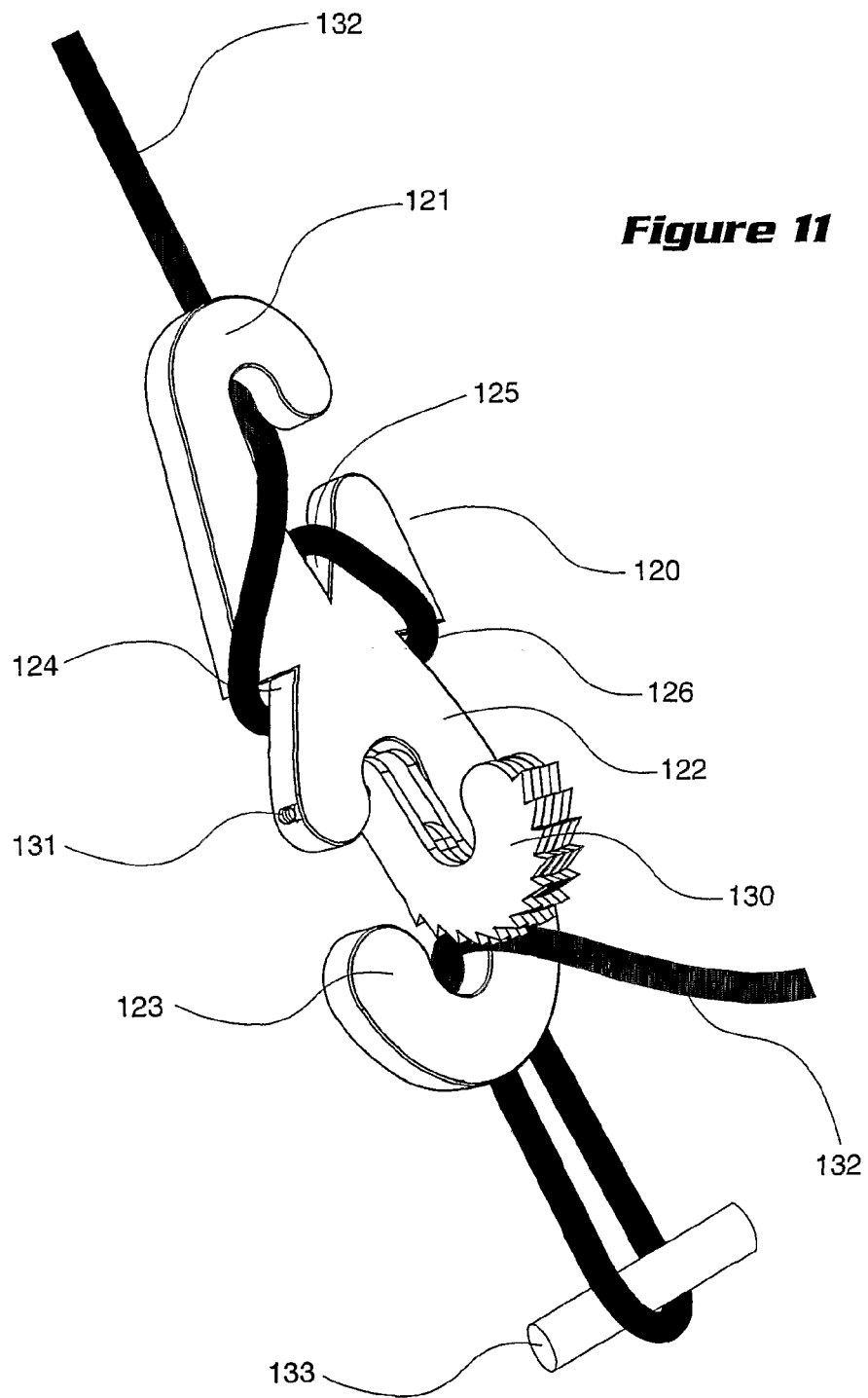
FIG. 11 shows a perspective view of a further rope tightening device.

Referring to FIG. 11, there is shown a rope tightening device generally designated 120 having a first hooked end 121, flat base 122 and second hooked end 123. Notches 124, 125 and 126 which operate in the same way as those described with respect to previous embodiments are provided for anchoring the rope. A claw 130 is used to prevent the rope 132 pulling a reverse direction.

The claw is attached to the rope tightening device by a pin 131, the attachment being such as to allow the claw 130 to pivot with respect to the flat base 122 of the device. It can be seen that the claw includes ratchet teeth 134 which prevent the rope 132 pulling a reverse direction when it is threaded through the device and over the anchor rod 133.

Figure 12:
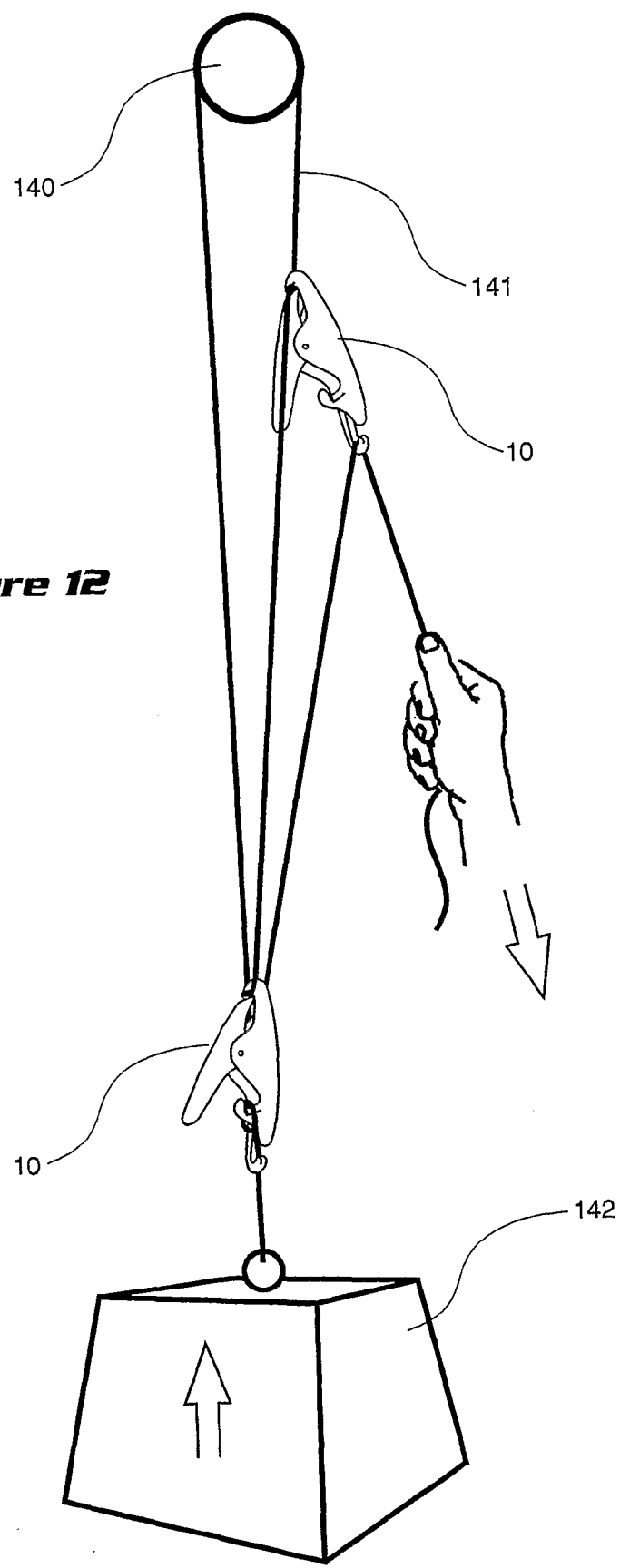
FIG. 12 shows a perspective view of two rope tightening devices of the type shown in FIG. 1 used in combination to lift a weight.

Referring to FIG. 12, two rope tightening devices 10 constructed in accordance with the device shown in FIG. 1 are combined in such a way as to act as an equivalent to a block and tackle in the configuration shown in the drawings to lift a weight 142.

This can be achieved by passing the rope through two rope tightening devices 10 in tandem and over an anchor rod 140 or pulley wheel. As each of the rope tightening devices can give a doubling of pulling force, the net effect of using two such devices in tandem is to quadruple the force.

It will be appreciated that as many rope tightening devices and anchor rods or pulley wheels may be used as is necessary to achieve the appropriate degree of force increase desired.

Figure 13:
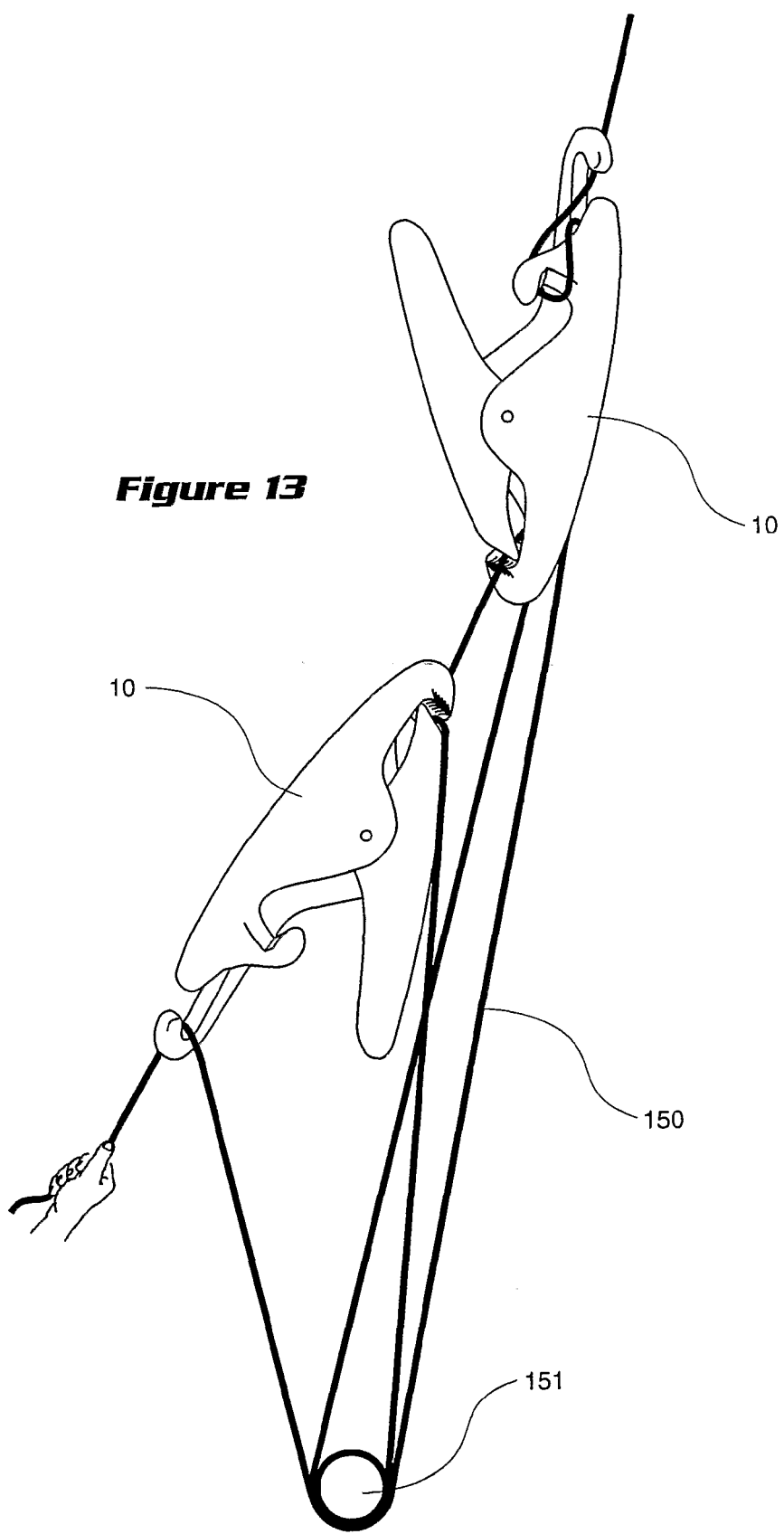
FIG. 13 shows two rope tightening devices of the type shown in FIG. 1 used in combination to double the effective tension force as opposed to a single rope tightening device.

An alternative arrangement for quadrupling force using two rope tightening devices 10 is shown in FIG. 13 with the rope 150 wound in the fashion illustrated over the anchor rod 151. Such a configuration may be used where especially high forces are required, such as when erecting a large tent or sail.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A rope tensioning device comprising,
   an elongate base having a first hooked end and a second hooked end,
   anchoring means for anchoring a rope on the device, and clamp means, wherein
   the clamp means are adapted to grip the rope inserted into the device allowing it to be pulled in a tightening direction in line with the direction along the elongate base from the first hooked end to the second hooked end to tension the rope, the clamp means being adapted to prevent the rope pulling in a reverse direction,
   the first hooked end is formed as an opening penetrating the elongate base whereby the rope may be threaded through the opening so that the rope extends from a rear face of the elongate base to an opposed front face of the elongate base,
   the anchoring means are located intermediate the first hooked end and second hooked end, and
   the clamp means are located so that they are arranged to clamp the rope at a position at or about the second hooked end, and
   wherein the elongate base allows the rope to extend through the first hooked end and the second hooked end.

2. A rope tensioning device according to claim 1 wherein the anchoring means comprise a protrusion extending from the elongate base at a position intermediate the hooked ends.

3. A rope tensioning device according to claim 1 wherein the anchoring means comprise a notch formed in the elongate base at a position intermediate the hooked ends.

4. A rope tensioning device according to claim 1 wherein the elongate base comprises a substantially flat member.

5. A rope tensioning device according to claim 1 wherein the clamp means comprise an arm mounted to the front face of the elongate base and the arm has one end movable towards the front face to grip the rope against the front face.

6. A rope tensioning device according to claim 5 wherein the arm is pivoted on a pin supported between two flanges on the front face and one end of the arm is biased towards the front face by a spring wound around the pin.

7. A rope tensioning device according to claim 1 wherein the clamp means comprise an arm extending from the first hooked end towards the second hooked end such that a clamping end of the arm extends to a position where it is opposed to the second hooked end, wherein the arm includes the anchoring means and is moveable into clamping engagement with the rope in response to tension applied across a length of the rope.

8. A rope tensioning device according to claim 1 wherein the clamp means comprise a pivotally mounted clamping member arranged to be pulled into clamping engagement with the rope by forming a frictional engagement between an end of the clamping member and an internal surface of the second hooked end when tension is applied across a length of the rope.

9. A rope tensioning device according to claim 1 wherein the hooked ends face in opposite directions.

10. A rope tensioning device according to claim 1 wherein the portion of the elongate base from which the first hook extends is provided with a wedge shaped section opposed to the first hooked end.

11. A rope tensioning device according to claim 1 wherein the elongate base comprises a pair of base members which are adapted to lie with internal faces opposed to each other.

12. A rope tensioning device according to claim 11 wherein each of the base members is provided with a first hook member at the first hooked end and a second hook member at the second hooked end wherein the pair of first hook members in combination comprise the first hooked end and the pair of second hook members in combination comprise the second hooked end.

13. A rope tensioning device according to claim 12 wherein the second pair of hook members in combination comprise the clamp means.

14. A rope tensioning device according to claim 12 wherein the pair of second hook members extend at an angle with respect to each other so as to create a wedge shaped opening for guiding the rope to be clamped between the pair of second hook members.

15. A method of tensioning rope that is fixed at one end using a rope tightening device comprising,
   inserting a length of rope through a first opening defined by a hooked first end of an elongate base so that the rope threads through an opening penetrating from a threads through an opening penetrating from a front face of the elongate base to an opposed rear face of the elongate base,
   anchoring the rope to the device by wrapping the rope around anchoring means on the device,
   returning the rope back through the first opening and on past the rear of the elongate base,
   looping the rope around a support separate from the rope tightening device,
   returning the rope into a second opening formed by a second hooked end at the rear of the elongate base,
   clamping the rope with a one way clamp at the second hooked end; and
   tightening the rope by pulling it so that the clamp prevents the rope moving in the reverse direction.

16. A method according to claim 15 wherein the anchoring means comprise one of,
- a peg projecting from the face of the elongate base, and
- a notch in the side of the elongate base.

17. A method according to claim 15 wherein clamping is effected by one of,
- a biased lever arm having an end which presses the rope against a surface of the second hooked end,
- a pair of hook members at the second hooked end the hook members being arranged to sandwich the rope therebetween, the arrangement of the rope on the device being such that tension in the rope acts to push the pair of hook members towards each other, and
- a claw mounted for pivotal movement in the second opening.

* * * * *